United States Patent
Harada

(10) Patent No.: US 7,508,161 B2
(45) Date of Patent: Mar. 24, 2009

(54) ELECTRONIC DEVICE AND POWER SUPPLY METHOD

(75) Inventor: Keiji Harada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 343 days.

(21) Appl. No.: 10/927,023

(22) Filed: Aug. 27, 2004

(65) Prior Publication Data

US 2005/0057223 A1 Mar. 17, 2005

(30) Foreign Application Priority Data

Sep. 16, 2003 (JP) .............................. 2003-323102

(51) Int. Cl.
*H02J 7/00* (2006.01)
*H04B 1/38* (2006.01)

(52) U.S. Cl. ...................... 320/103; 320/134; 455/572

(58) Field of Classification Search ................. 320/103, 320/134; 455/572; 370/401; 307/48
See application file for complete search history.

(56) References Cited

U.S. PATENT DOCUMENTS

| | | | | |
|---|---|---|---|---|
| 4,313,124 | A | 1/1982 | Hara | 346/140 |
| 4,345,262 | A | 8/1982 | Shirato et al. | 346/140 |
| 4,463,359 | A | 7/1984 | Ayata et al. | 346/1.1 |
| 4,723,129 | A | 2/1988 | Endo et al. | 346/1.1 |
| 4,740,796 | A | 4/1988 | Endo et al. | 346/1.1 |
| 6,501,249 | B1 * | 12/2002 | Drori | 320/149 |
| 6,531,845 | B2 | 3/2003 | Kerai et al. | 320/107 |
| 6,654,378 | B1 * | 11/2003 | Mahany et al. | 370/401 |
| 2001/0032275 | A1 * | 10/2001 | Watanabe et al. | 710/1 |

FOREIGN PATENT DOCUMENTS

| | | |
|---|---|---|
| JP | 10-201127 | 7/1998 |
| JP | 2000-047758 | 2/2000 |
| JP | 2002-044876 | 2/2002 |
| JP | 2002-191133 | 7/2002 |
| JP | 2003-032910 | 1/2003 |
| WO | 02/17460 | 2/2002 |

* cited by examiner

*Primary Examiner*—Gary L Laxton
*Assistant Examiner*—Yalkew Fantu
(74) *Attorney, Agent, or Firm*—Fitzpatrick, Cella, Harper & Scinto

(57) ABSTRACT

An electronic device and its power supply method for charging a battery of the device, which normally operates as a master, through a power supply line, without impairing a function as a master. For example, in an environment where a battery-driven first electronic device and an AC power-driven second electronic device are interconnected via a communication path including a power supply line, it is detected whether or not the capacity of the battery in the first electronic device is sufficient, and in accordance with the result of detection, power supply from the second electronic device is requested. In accordance with the request, electric power from the AC power source of the second electronic device is supplied to the first electronic device via the power supply line, to charge the battery of the first electronic device with the power supply, and it is monitored whether or not the charging has been completed. In accordance with the result of monitoring, the power supply from the second electronic device is stopped, and the first and second electronic devices are returned to a communication stand-by status.

15 Claims, 6 Drawing Sheets

ELECTRONIC DEVICE AND POWER SUPPLY METHOD

FIELD OF THE INVENTION

This invention relates to an electronic device and a power supply method, and more particularly, to an electronic device connected to a communication path having a power supply line and a power supply method between such electronic devices.

BACKGROUND OF THE INVENTION

Conventionally, a power supply line, associated with a communication path used for mutual communication between electronic devices, has been used for an electronic device having no power source to receive electric power from an electronic device with a power source. The power supply line almost has not been used for charging a battery-driven electronic device.

In recent years, devices to charge a battery driven electronic device using this power supply line have been proposed as disclosed in Japanese Patent Application Laid-Open Nos. 2002-044876 and 2002-191133. However, these devices relate to an electronic device which fixedly operates as a slave.

Further, in a recently-proposed system having plural electronic devices interconnected via a communication line, the master-slave relation is dynamically switched over in accordance with operational status at any given time.

However, the conventional power supply method, for merely charging a slave device in fixed master-slave relation by using a power supply line associated with a communication path, cannot be applied to the above system.

SUMMARY OF THE INVENTION

Accordingly, the present invention is conceived as a response to the above-described disadvantages of the conventional art.

For example, a system and method according to the present invention is capable of, in an electronic device connected to a communication system where master-slave relation is dynamically switched over, charging a battery of an electronic device which normally operates as a master, through a power supply line, without impairing a function as a master.

According to one aspect of the present invention, preferably, there is provided a system in which a first electronic device with at least a battery as a primary power source and a second electronic device with an AC power source as a primary power source are interconnected via a communication path including a power supply line, wherein the first electronic device comprises: detection means for detecting whether or not a capacity of the battery is sufficient; request means for, in accordance with a result of detection by the detection means, issuing a request to the second electronic device, so as to receive power supply from the second electronic device; charging means for receiving the power supply from the second electronic device via the power supply line and charging the battery; monitor means for monitoring whether or not charging by the charging means has been completed; and returning means for, in accordance with a result of monitoring by the monitor means, stopping the power supply from the second electronic device, and returning to a communication stand-by status for communication with the second electronic device, and the second electronic device comprises: power supply means for, in accordance with the request by the request means, supplying electric power from the AC power source to the first electronic device via the power supply line.

According to another aspect of the present invention, preferably, there is provided a power supply method for a system in which a first electronic device with at least a battery as a primary power source and a second electronic device with an AC power source as a primary power source are interconnected via a communication path including a power supply line, comprising: a detection step of detecting whether or not a capacity of the battery in the electronic device is sufficient; a request step of, in accordance with a result of detection at the detection step, issuing a request to the second electronic device, so as to receive power supply from the second electronic device; a supply step of, in accordance with the request at the request step, supplying electric power from the AC power source of the second electronic device to the first electronic device via the power supply line; a charging step of receiving the power supply from the second electronic device via the power supply line and charging the battery; a monitor step of monitoring whether or not charging at the charging step has been completed; and a returning step of, in accordance with a result of monitoring at the monitor step, stopping the power supply from the second electronic device, and returning the first electronic device and the second electronic device to a communication stand-by status.

In the above method, it is preferable that the first and second electronic devices are in master-slave relation, and generally, the first electronic device operates as a master and the second electronic device, as a slave.

On such presupposition, it is preferable that the method further comprises a first switch-over step of, prior to charging at the charging step, switching the first electronic device over from a master to a slave and switching the second electronic device over from a slave to a master, and a second switch-over step of, upon completion of charging operation at the charging step, switching the first electronic device over from the slave to the master and switching the second electronic device over from the master to the slave.

To realize the master-slave switch-over, it may be arranged such that the elapsed time from the start of power supply from the second electronic device to the first electronic device is monitored, and if it is determined that a predetermined period has elapsed, the second changing step is controlled so as to switch over the relation between the master and slave.

Alternatively, to realize similar switch-over, it may be arranged such that after the start of power supply from the second electronic device to the first electronic device, an inquiry about the device status of the first electronic device is made from the second electronic device, then as a response to the inquiry, the current device status is returned from the first electronic device to the second electronic device, and in accordance with the response, the second changing step is controlled so as to switch over the relation between the master and slave.

In the above construction, it is preferable that the method further comprises a communication step of performing data communication between the first and second electronic devices via the communication path, and after the completion of the communication, the battery capacity is detected at the detection step.

Note that the first electronic drive includes a cellular phone or a personal digital assistant (PDA), and the second electronic device includes a printing apparatus for receiving data from a cellular phone or personal digital assistant and performing printing.

According to still another aspect of the present invention, preferably, there is provided an electronic device, primarily driven with a battery, connectable with an external device via a communication path including a power supply line, which normally operates as a master to the external device, comprising: detection means for detecting whether or not a capacity of the battery is sufficient; request means for, in accordance with a result of detection by the detection means, issuing a request to the external device, so as to receive power supply from the external device; charging means for switching an operation status of the electronic device over from the master to a slave to the external device, receiving the power supply from the external device via the power supply line, and charging the battery; monitor means for monitoring whether or not charging by the charging means has been completed; and returning means for, in accordance with a result of monitoring by the monitor means, stopping the power supply from the external device, switching the operation status over from the slave to the master to the external device, and returning to a communication stand-by status for communication with the external device.

According to still another aspect of the present invention, preferably, there is provided an electronic device, primarily driven with an AC power source, connectable to an external device via a communication path including a power supply line, which normally operates as a slave to the external device, comprising: first switch-over means for, when electric power is supplied to the external device in accordance with a request from the external device, switching an operation status of the electronic device over from the slave to a master to the external device; power supply means for supplying the electric power from the AC power source to the external device via the power supply line; and second switch-over means for, when power supply to the external device is stopped, switching the operation status over from the master to the slave.

The invention is particularly advantageous since a battery of an electronic device which generally operates as a master can be charged with an AC power source of an external device through a power supply line included in a communication path used in communication with the external device, without impairing a function as a master.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1:
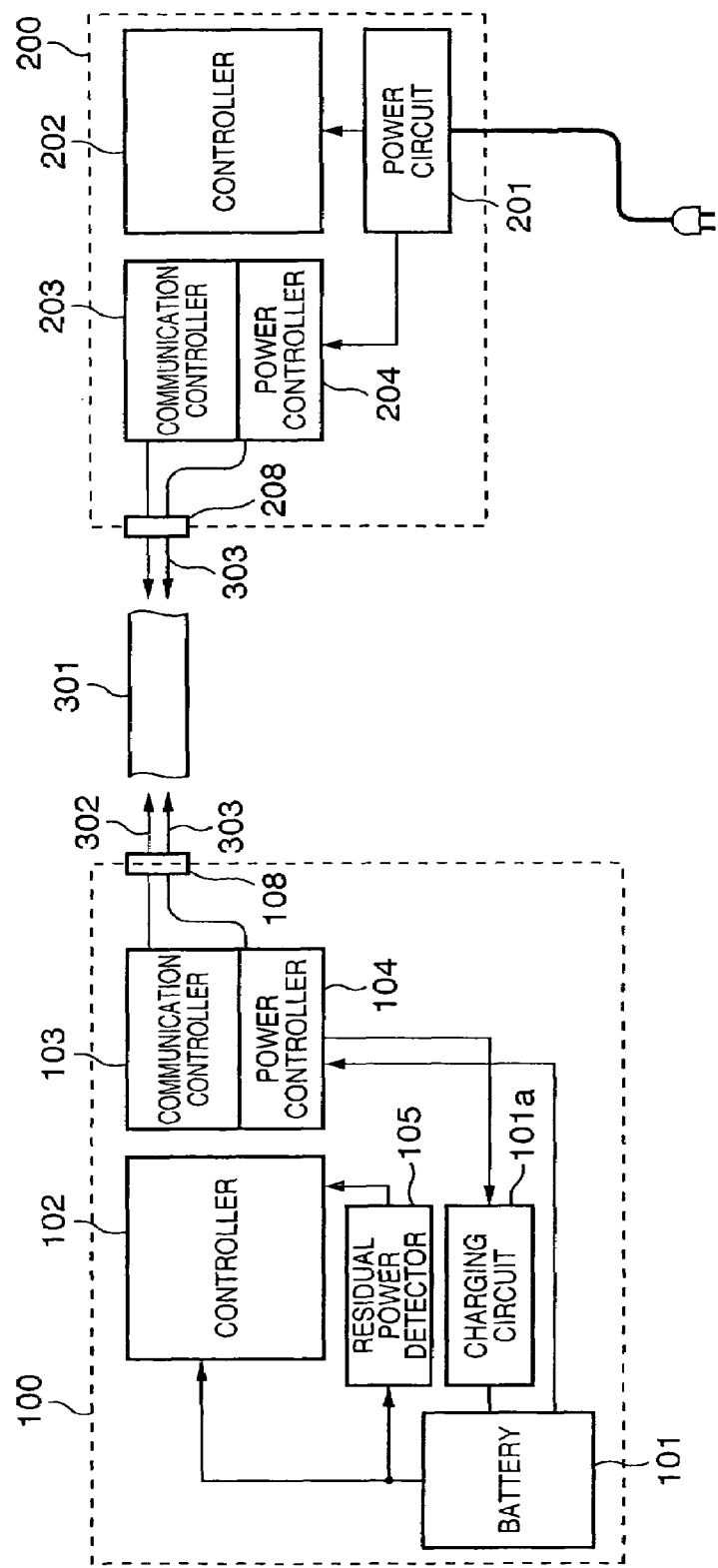
FIG. 1 is a block diagram showing the internal constructions of two electronic devices interconnected with a communication path, related to power supply controllers.

FIG. 1 is a block diagram showing the internal constructions of two electronic devices interconnected via a communication path, related to power supply controllers according to a typical embodiment of the present invention.

As it is understood from FIG. 1, an electronic device 100 which is a battery-driven device and an electronic device 200 as an AC-driven device are interconnected via a communication cable 301.

The power supply controller of the electronic device 100 has a battery 101, a charging circuit 101a which receives power supply from an external device and charges the battery 101, a controller 102, including an MPU and a memory holding a control program, which controls the overall electronic device 100, a communication controller 103 which controls communication with the electronic device 200 connected via the communication cable 301, in accordance with a command from the controller 102, a power controller 104 which supplies electric power supplied from the battery 101 to the electronic device 200 through a power supply line 303 or supplies electric power supplied from the electronic device 200 to the charging circuit 110a, in accordance with a command from the controller 102, and a residual power detector 105 which detects a residual capacity of the battery 101 and notifies it to the controller 102.

Further, the electronic device 100, which can determine the start/end, direction, speed and the like of communication with the electronic device 200, normally operates as a master device to the electronic device 200, however, in accordance with necessity, the electronic device 100 gives a master-slave switch-over permission (hereinbelow, MS switch-over permission) to the electronic device 200 and operates as a slave electronic device. The power controller 104 of the electronic device 100 operates in accordance with this MS switch-over permission. When the electronic device 100 is a master, the power controller 104 performs power supply to the power supply line 303 through the battery 101, while when the electronic device 100 is a slave, the power controller 104 supplies power supplied from the power supply line 303 to the charging circuit 101a.

On the other hand, the electronic device 200 has a power circuit 201 for an AC power source, a controller 202, including an MPU and a memory holding a control program, which controls the overall electronic device 200, a communication controller 203 which controls communication with the electronic device 100 in accordance with a command from the controller 202, and a power controller 204 which supplies electric power supplied from the power circuit 201 to the electronic device 100 through the power supply line 303 in accordance with a command from the controller 202.

The electronic device 200 normally operates as a slave electronic device. When an MS switch-over permission is given from the electronic device 100, the electronic device also operates as a master electronic device. The power controller 204 of the electronic device 200 operates in accordance with this MS switch-over permission. When the electronic device 200 is a master, the power controller 204 performs power supply to the power supply line 303 through the power circuit 201, while when the electronic device 200 is a slave, the power controller 204 does not consume electric power supplied from the power supply line 303.

Note that in FIG. 1, numerals 108 and 208 denote connectors connecting the communication cable 301; and 302, a signal line.

Next, embodiments of charging processing performed by the electronic devices having the above constructions will be described with reference to the flowcharts of FIGS. 2 and 3.

First Embodiment

Figure 2:
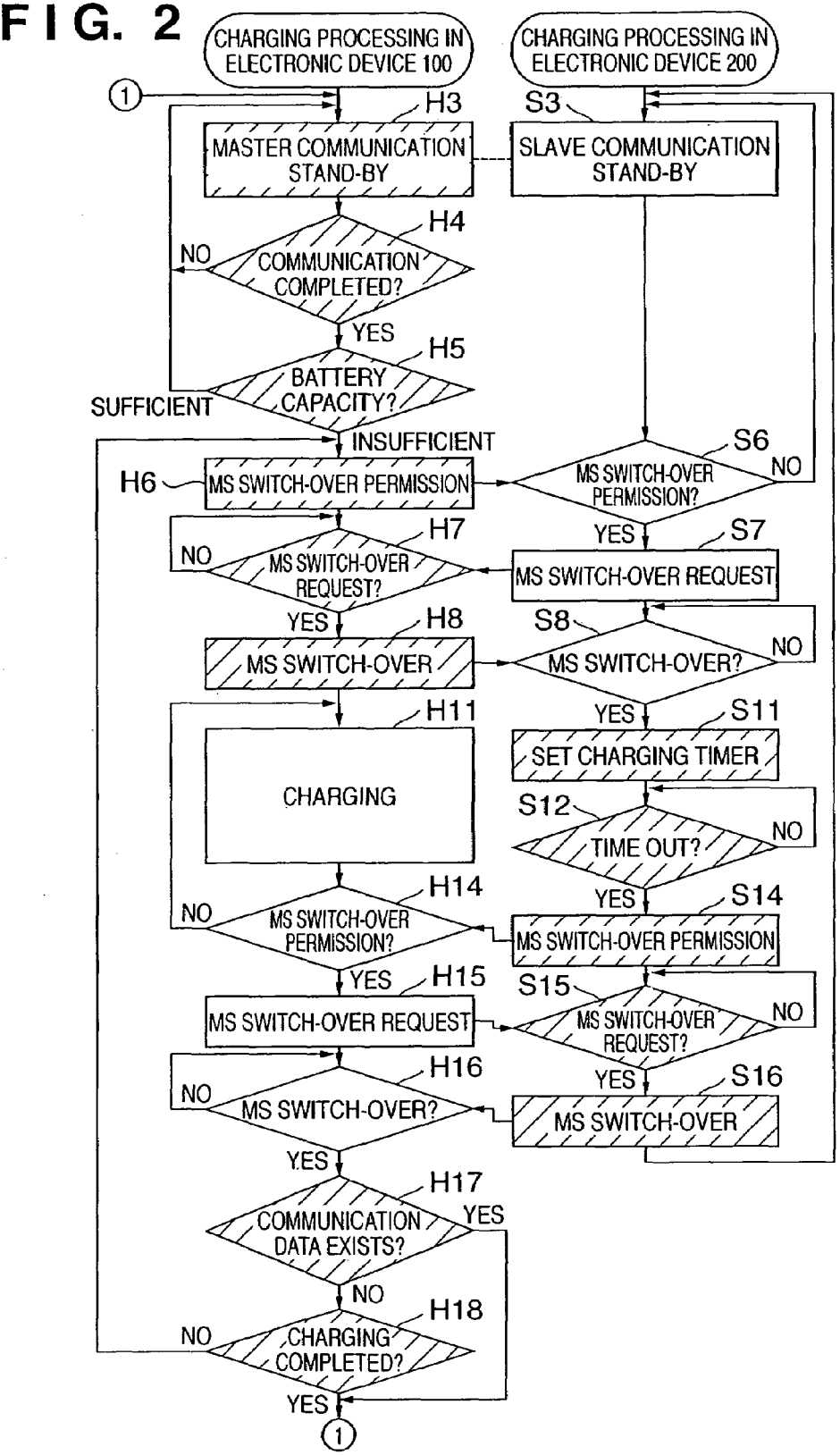
FIG. 2 is a flowchart showing charging processing according to a first embodiment of the present invention.

FIG. 2 is a flowchart showing the charging processing according to a first embodiment of the present invention. Note that in the flowchart of FIG. 2, a left side flow represents processing in the electronic device 100, and a right side flow, processing in the electronic device 200. Further, process steps when the electronic device 100 or 200 operates as a master are hatched, and at non-hatched steps, the electronic device 100 or 200 operates as a slave.

First, a user of electronic devices connects the electronic devices 100 and 200 using the communication cable 301, then the respective electronic devices recognize that they are interconnected and enter in a communication stand-by status (step H3 and step S3).

At this time, if the electronic device 100 has a job to be communicated to the electronic device 200, the electronic device 100 as a master and the electronic device 200 as a slave perform necessary communication (job transfer and transfer acknowledgment and the like)(steps H3 to H4 and step S4).

Next, when the communication has been completed, the electronic device 100 checks the battery capacity by using the residual power detector 105 (step H5). If the residual capacity is not sufficient, the electronic device 100 issues an MS switch-over permission to the electronic device 200 (step H6). The electronic device 200 receives the MS switch-over permission (step S6), and issues a master-slave (MS) switch-over request to the electronic device 100 (step S7).

The electronic device 100 receives the MS switch-over request (step H7), stops power supply from the power controller 104 to the power supply line 303, and performs switch-over from the master to a slave (step H8).

The electronic device 200 checks that the electronic device 100 has switched over from the master to a slave (step H8), then starts power supply from the power controller 204 to the power supply line 303.

Through the above processing, the electronic device 100 switches over from the master to the slave, while the electronic device 200 switches over from the slave to a master. When power supply has been started from the electronic device 200 to the electronic device 100 through the power supply line 303, the electronic device 100 starts charging to the battery 101 by the power controller 104 and the charging circuit 101a (step H11).

Next, the electronic device 200 sets an internal charging timer (not shown) included in the controller 202 (step S11). The charging timer generates an interruption (charging time-out interruption) to the controller 202 at intervals of 10 ms to 1 sec in accordance with the set time, for monitoring elapsed time (S12). During the period of the set time, the electronic device 100 which is initially a master becomes a slave and cannot take the initiative in communication, and the charging amount in the battery 106 can be increased by the set time.

When the set time as charging time-out has elapsed, the electronic device 200 issues an MS switch-over permission to the electronic device 100 (step S14).

The electronic device 100 receives the MS switch-over permission (step H14), and issues an MS switch-over request to the electronic device 200 (step H15).

The electronic device 200 receives the MS switch-over request (step S15), stops power supply from the power controller 204 to the power supply line 303, and switches over from the master to the slave (step S16). Then the electronic device 200 returns to the slave stand-by communication status (step S3).

The electronic device 100 checks that the electronic device 200 has switched over to the slave, then starts power supply from the power controller 104 to the power supply line 303 (step H16).

The electronic device 100 examines whether or not data to be communicated to the electronic device 200 exists. If data to be communicated to the electronic device 200 exists, the electronic device 100 returns to the master stand-by communication status (step H3). The electronic device 100 as a master performs communication with the electronic device 200 as a slave. On the other hand, if no data to be communicated to the electronic device 200 exists, the electronic device 100 checks the charging status of the battery 101 by using the residual power detector 105 (step H18). If the charging of the battery 101 is not sufficient, the electronic device 100 returns to the status where an MS switch-over permission is to be issued (step H6), then issues an MS switch-over permission, to repeat the above charging processing. If it is determined that the charging has been completed, the electronic device 100 returns to the master stand-by communication status (step H3).

As described above, according to the first embodiment, in a case where the battery capacity is insufficient when necessary communication has been completed, the master-slave relation is switched over, and power supply from an AC-power driven electronic device is received and battery charging can be performed. Further, as the charging timer is set with an appropriate period, the master-slave relation is switched over upon each time-out and it can be checked whether or not communication data from a battery-driven electronic device exists. Accordingly, smooth communication can be maintained.

Second Embodiment

Figure 3:
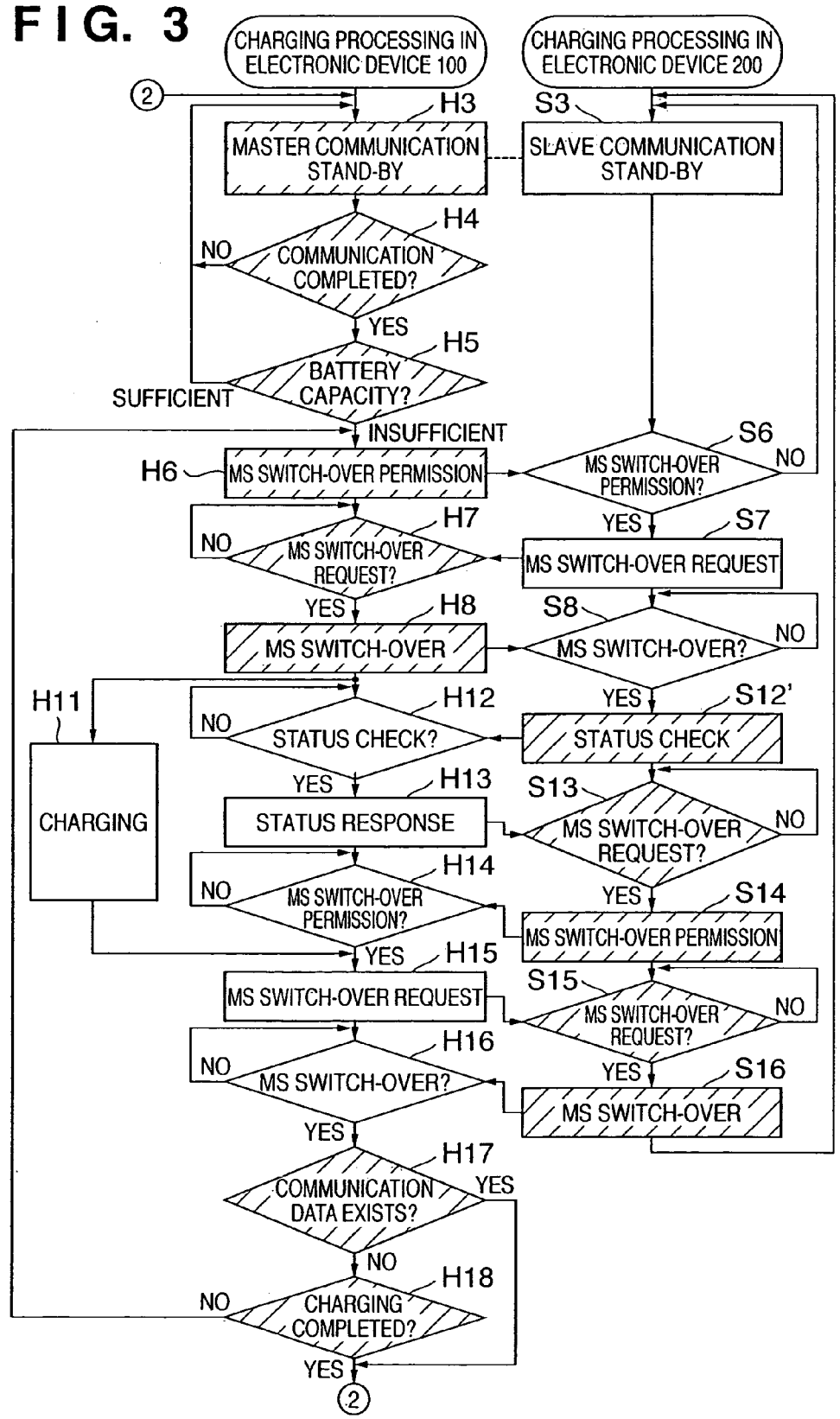
FIG. 3 is a flowchart showing charging processing according to a second embodiment of the present invention.

FIG. 3 is a flowchart showing charging processing according to a second embodiment of the present invention.

Note that in FIG. 3, the same processings as those described in FIG. 2 have the same step numbers and the explanations thereof will be omitted, and only steps characteristic of the present embodiment will be described.

First, the user of electronic devices connects the electronic devices 100 and 200 using the communication cable 301, then the respective electronic devices recognize that they are interconnected and enter in a communication stand-by status (step H3 and step S3).

Hereinbelow, the electronic device 100 performs the processing at steps H3 to H8, and the electronic device 200, the processing at steps S3 to S8. Then through these processings, the electronic device 100 switches over from a master to a slave, and the electronic device 200, from a slave to a master. When the power supply has been started from the electronic device 200 through the power supply line 303 to the electronic device 100, the electronic device 100 starts charging of the battery 101 by the power controller 104 and the charging circuit 110a (step H11). At this time, the electronic device 100 is also in a status-request waiting status to receive a status request from the electronic device 200 (step H12).

While the electronic device 100 is performing charging with electric power supplied from the electronic device 200, the electronic device 200 as a master issues a status request to the electronic device 100 as a slave so as to check a status indicating whether or not master right is necessary (step S12').

The electronic device 100 receives the request and reports the current status to the electronic device 200 (step H13). Then the electronic device 100 which has made a status response enters into a status to wait for MS switch-over permission (step H14).

The electronic device 200 receives the status, and examines from the status whether or not the electronic device 100 needs master right (step S13). Note that the determination is equivalent to the determination as to whether or not an MS switch-over request has been made. If it is determined that the master right is needed, it is determined that an MS switch-over request has been made. The electronic device 200 issues an MS switch-over permission to the electronic device 100 (step S14). On the other hand, if it is determined that master right is not needed, it is determined that an MS switch-over request has not been made, and the status checking is repeated.

When the electronic device 100 receives the MS switch-over permission, it issues an MS switch-over request to the electronic device 200 (step H15). Note that when the charging has been completed, the electronic device 100 also issues an MS switch-over request to the electronic device 200.

Hereinbelow, as described in the flowchart of FIG. 2, the electronic device 100 side performs the processing at steps H15 to H18, while the electronic device 200 side, the processing at steps S15 to S16.

As described above, according to the present embodiment, even when an AC-driven electronic device has become a master, the AC-driven electronic device always performs status checking on a slave battery-driven electronic device, such that the master-slave relation can be switched over in accordance with necessity in the battery-driven electronic device, then if the battery capacity is insufficient when necessary communication has been completed, the master-slave relation is switched over, thus making it possible for the battery-driven electronic device to perform necessary operations and processing.

In this manner, in any of the processings shown in FIGS. 2 and 3, dynamic switch-over of master-slave relation is enabled, and the battery of a battery-driven electronic device which normally operates as a master electronic device can be charged through a power supply line included in a communication cable.

Further, the battery-driven electronic device, which is a slave during battery charging, can be switched over to the master when necessary by either using the charging timer in the processing in FIG. 2 or performing the status checking in the processing in FIG. 3. Thus, the electronic device which is seemingly a master can charge its battery.

Figure 4:
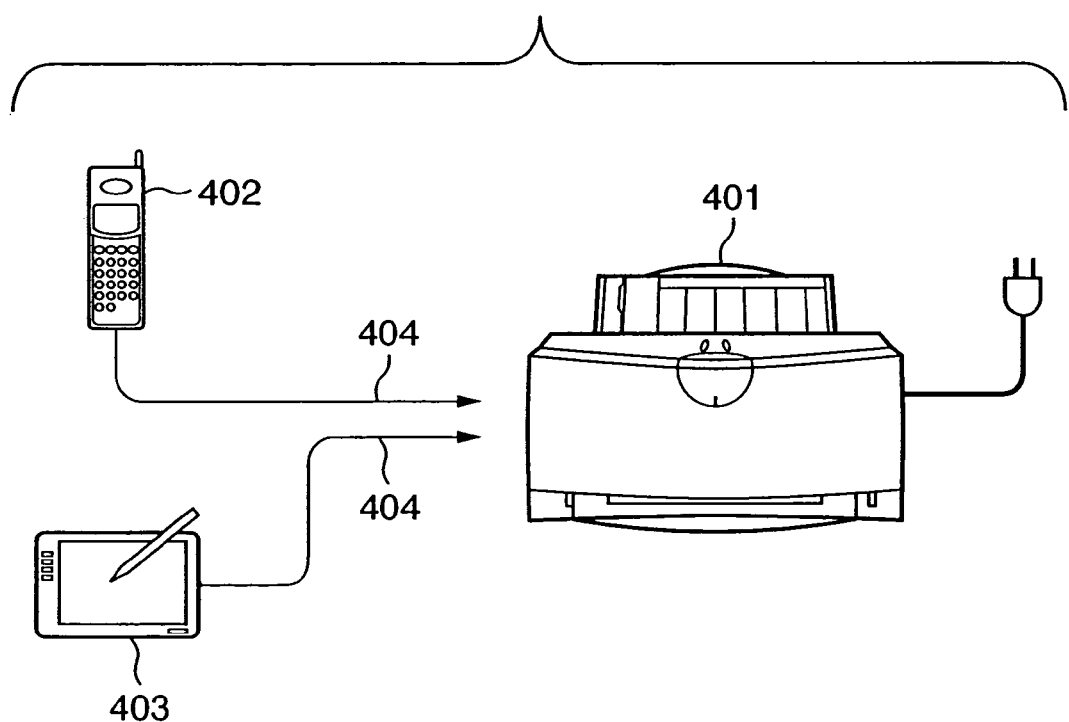
FIG. 4 is a specific example of electronic devices interconnected with a communication line in FIG. 1.

FIG. 4 is a specific example of electronic devices interconnected with the communication line shown in FIG. 1.

As it is understood from a comparison between FIG. 4 and FIG. 1, a printing apparatus 401 corresponds to the electronic device 200 with the AC power source as a primary power source, and a cellular phone 402 and a personal digital assistant (PDA) 403, to the electronic device 100 with a battery as a primary power source.

The cellular phone 402 and the PDA 403 are connected to the printing apparatus 401 via a communication cable 404, thereby they can charge their batteries through a power supply line included in the communication cable without impairing their function as a master electronic device.

Next, an inkjet printing apparatus as a typical embodiment of the printing apparatus 401 will be described.

<Description of Inkjet Printing Apparatus (FIG. 5)>

Figure 5:
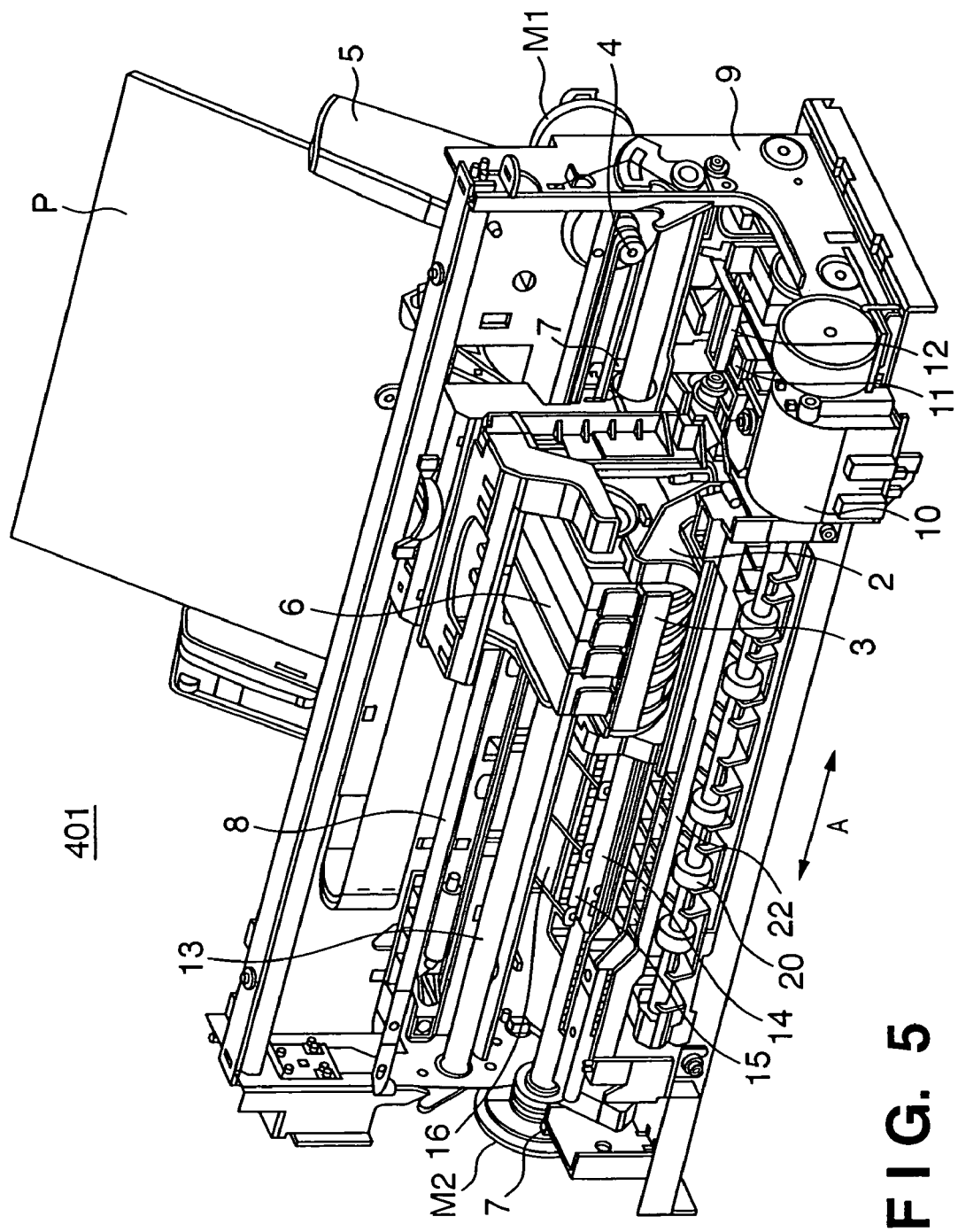
FIG. 5 is an external perspective view showing the structure of an inkjet printing apparatus.

FIG. 5 is a perspective view showing an external appearance of the configuration of an inkjet printing apparatus 401 which is a typical embodiment of the present invention.

The inkjet printing apparatus 401 (hereinafter referred to as the printer) shown in FIG. 5 performs printing in the following manner. Driving force generated by a carriage motor M1 is transmitted from a transmission mechanism 4 to a carriage 2 incorporating a printhead 3, which performs printing by discharging ink in accordance with an inkjet method, and the carriage 2 is reciprocally moved in the direction of arrow A. A printing medium P, e.g., printing paper, is fed by a paper feeding mechanism 5 to be conveyed to a printing position, and ink is discharged by the printhead 3 at the printing position of the printing medium P, thereby realizing printing.

To maintain an excellent state of the printhead 3, the carriage 2 is moved to the position of a recovery device 10, and discharge recovery processing of the printhead 3 is intermittently performed.

In the carriage 2 of the printer 401, not only the printhead 3 is mounted, but also an ink cartridge 6 reserving ink to be supplied to the printhead 3 is mounted. The ink cartridge 6 is attachable/detachable to/from the carriage 2. Note that reference numeral 6 is used when collectively referring to four independent ink cartridges described below.

The printer 401 shown in FIG. 5 is capable of color printing. Therefore, the carriage 2 holds four ink cartridges respectively containing magenta (M), cyan (C), yellow (Y), and black (K) inks. These four cartridges are independently attachable/detachable.

Appropriate contact between the junction surfaces of the carriage 2 and the printhead 3 can achieve necessary electrical connection. By applying energy to the printhead 3 in accordance with a printing signal, the printhead 3 selectively discharges ink from plural discharge orifices, thereby performing printing. In particular, the printhead 3 according to this embodiment adopts an inkjet method which discharges ink by utilizing heat energy, and comprises electrothermal transducers for generating heat energy. Electric energy applied to the electrothermal transducers is converted to heat energy, which is then applied to ink, thereby creating film boiling. This film boiling causes growth and shrinkage of a bubble in the ink, and generates a pressure change. By utilizing the pressure change, ink is discharged from the discharge orifices. The electrothermal transducer is provided in correspondence with each discharge orifice. By applying a pulsed voltage to the corresponding electrothermal transducer in accordance with a printing signal, ink is discharged from the corresponding discharge orifice.

As shown in FIG. 5, the carriage 2 is connected to a part of a driving belt 7 of the transmission mechanism 4 which transmits driving force of the carriage motor M1, and is slidably supported along a guide shaft 13 in the direction of arrow A. Therefore, the carriage 2 reciprocally moves along the guide shaft 13 in accordance with normal rotation and reverse rotation of the carriage motor M1. In parallel with the moving direction of the carriage 2 (direction of arrow A), a scale 8 is provided to indicate an absolute position of the carriage 2. In this embodiment, the scale 8 is a transparent PET film on which black bars are printed in necessary pitches. One end of the scale 8 is fixed to a chassis 9, and the other end is supported by a leaf spring (not shown).

In the printer 401, a platen (not shown) is provided opposite to the discharge orifice surface where discharge orifices (not shown) of the printhead 3 are formed. As the carriage 2 incorporating the printhead 3 is reciprocally moved by the driving force of the carriage motor M1, a printing signal is supplied to the printhead 3 to discharge ink, and printing is performed on the entire width of the printing medium P conveyed on the platen.

Furthermore, in FIG. 5, numeral 14 denotes a conveyance roller driven by a conveyance motor M2 for conveying the printing medium P. Numeral 15 denotes a pinch roller that presses the printing medium P against the conveyance roller 14 by a spring (not shown). Numeral 16 denotes a pinch roller holder which rotatably supports the pinch roller 15. Numeral 17 denotes a conveyance roller gear fixed to one end of the conveyance roller 14. The conveyance roller 14 is driven by rotation of the conveyance motor M2 transmitted to the conveyance roller gear 17 through an intermediate gear (not shown).

Numeral 20 denotes a discharge roller for discharging the printing medium P, where an image is formed by the printhead 3, outside the printer. The discharge roller 20 is driven by receiving rotation of the conveyance motor M2. Note that the discharge roller 20 presses the printing medium P by a spur roller (not shown) that presses the printing medium by a spring. Numeral 22 denotes a spur holder which rotatably supports the spur roller.

Furthermore, as shown in FIG. 5, the printer 401 includes the recovery device 10 for recovering discharge failure of the printhead 3, which is arranged at a desired position (e.g., a position corresponding to the home position) outside the reciprocal movement range for printing operation (outside the printing area) of the carriage 2 that incorporates the printhead 3.

The recovery device 10 comprises a capping mechanism 11 for capping the discharge orifice surface of the printhead 3, and a wiping mechanism 12 for cleaning the discharge orifice surface of the printhead 3. In conjunction with the capping operation of the capping mechanism 11, suction means (suction pump or the like) of the recovery device enforces ink discharge from the discharge orifices, thereby executing discharge recovery operation, that is, removing high-viscosity ink and bubbles in the ink channel of the printhead 3.

In addition, when printing operation is not performed, the discharge orifice surface of the printhead 3 is capped by the capping mechanism 11 for protecting the printhead 3 and preventing ink from evaporation and drying. The wiping mechanism 12 is arranged in the neighborhood of the capping mechanism 11 for wiping off an ink droplet attached to the discharge orifice surface of the printhead 3.

By virtue of the capping mechanism 11 and wiping mechanism 12, a normal ink discharge condition of the printhead 3 can be maintained.

<Control Arrangement of Inkjet Printing Apparatus (FIG. 6)>

Figure 6:
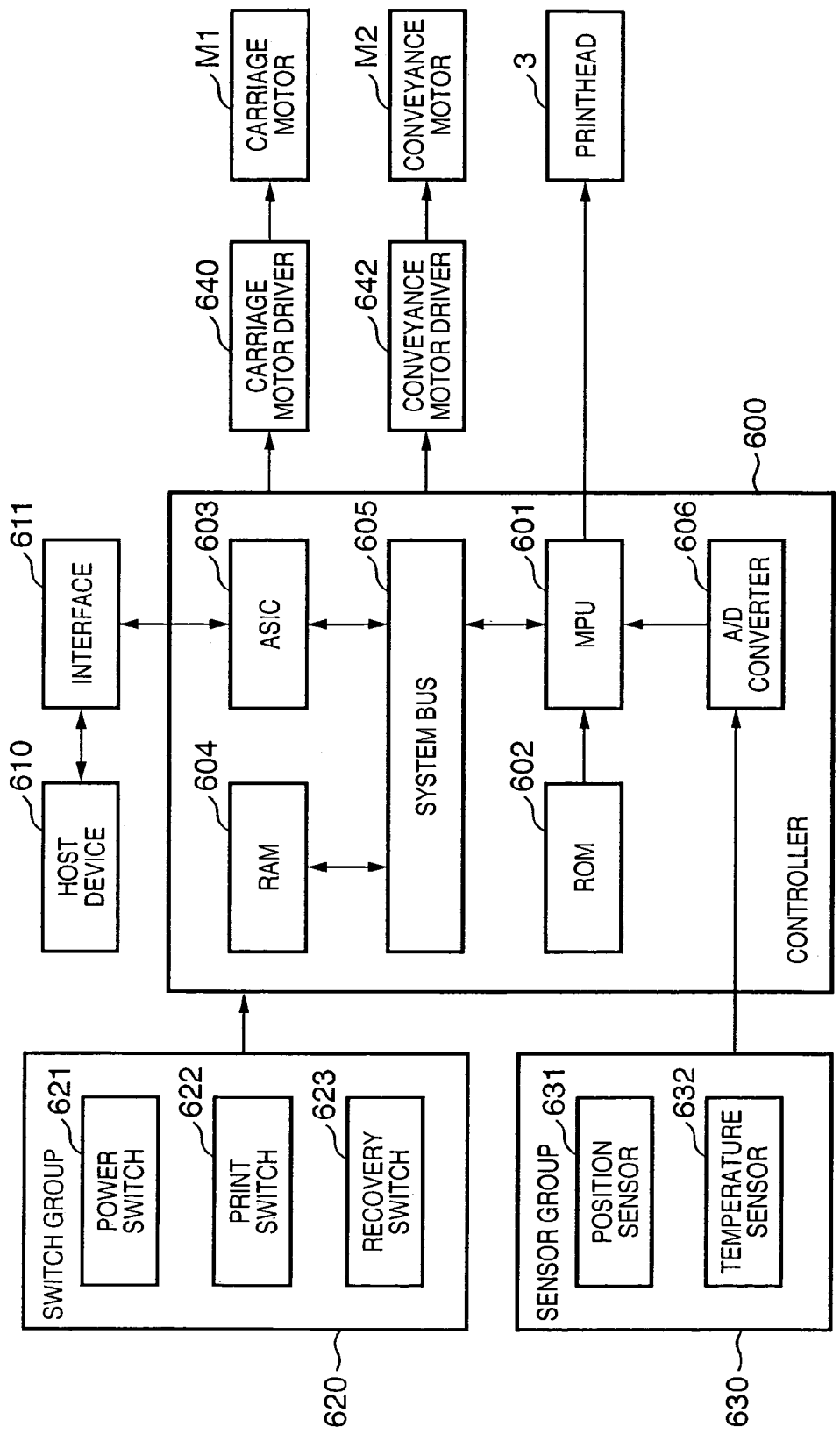
FIG. 6 is a block diagram showing the construction of the printing apparatus in FIG. 5.

FIG. 6 is a block diagram showing a control structure of the printer shown in FIG. 5.

Referring to FIG. 6, a controller 600 comprises: an MPU 601; ROM 602 storing a program corresponding to the control sequence which will be described later, predetermined tables, and other fixed data; an Application Specific Integrated Circuit (ASIC) 603 generating control signals for controlling the carriage motor M1, conveyance motor M2, and printhead 3; RAM 604 providing an image data developing area or a working area for executing a program; a system bus 605 for mutually connecting the MPU 601, ASIC 603, and RAM 604 for data transmission and reception; and an A/D converter 606 performing A/D conversion on an analog signal inputted by sensors which will be described later and supplying a digital signal to the MPU 601.

In FIG. 6, numeral 610 denotes a unit (including the cellular phone 402, the PDA 403, a personal computer (not shown), an image reader (not shown), digital camera (not shown) or the like), serving as an image data supplying source, which is generically referred to as a host unit. Between the host unit 610 and printer 1, image data, commands, status signals and so forth are transmitted or received via an interface (I/F) 611.

Note that the interface (I/F) 611 is not limited to a single unit, but includes various types of units corresponding to image data sources conforming to USB, centronics, IEEE 1394, IrDA, PCMCIA and the like.

Numeral 620 denotes switches for receiving commands from an operator, which includes a power switch 621, a print switch 622 for designating a print start, and a recovery switch 623 for designating a start of the processing (recovery processing) aimed to maintain an excellent ink discharge state of the printhead 3. Numeral 630 denotes sensors for detecting an apparatus state, which includes a position sensor 631 such as a photo-coupler for detecting a home position h, and a temperature sensor 632 provided at an appropriate position of the printer for detecting an environmental temperature.

Numeral 640 denotes a carriage motor driver which drives the carriage motor M1 for reciprocally scanning the carriage 2 in the direction of arrow A. Numeral 642 denotes a conveyance motor driver which drives the conveyance motor M2 for conveying the printing medium P.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink (e.g., can solidify or insolubilize a coloring agent contained in ink applied to the print medium).

Furthermore, unless otherwise stated, the term "nozzle" generally means a set of a discharge orifice, a liquid channel connected to the orifice and an element to generate energy utilized for ink discharge.

Further note that in the foregoing embodiments, although the description has been provided based on an assumption that a droplet discharged by the printhead is ink and that the liquid contained in the ink tank is ink, the contents are not limited to ink. For instance, the ink tank may contain processed liquid or the like, which is discharged to a printing medium in order to improve the fixability or water repellency of the printed image or to improve the image quality.

Each of the above-described embodiments comprises means (e.g., an electrothermal transducer or the like) for generating heat energy as energy utilized upon execution of ink discharge, and adopts the method which causes a change in state of ink by the heat energy, among the ink-jet printing method. According to this printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called an on-demand type and a continuous type. Particularly, in the case of the on-demand type, the system is effective because, by applying at least one driving signal, which corresponds to printing information and gives a rapid temperature rise exceeding nucleate boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

Furthermore, although each of the above-described embodiments adopts a serial-type printer which performs printing by scanning a printhead, a full-line type printer employing a printhead having a length corresponding to the width of a maximum printing medium may be adopted. For a full-line type printhead, either the arrangement which satisfies the full-line length by combining a plurality of printheads as described above or the arrangement as a single printhead obtained by forming printheads integrally can be used.

In addition, not only a cartridge type printhead in which an ink tank is integrally arranged on the printhead itself as described in the above embodiment but also an exchangeable chip type printhead which can be electrically connected to the apparatus main unit and can receive an ink from the apparatus main unit upon being mounted on the apparatus main unit can be applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printhead or by combining a plurality of printheads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, the printer of the present invention may be used in the form of a copying machine combined with a reader, and the like, or a facsimile apparatus having a transmission/reception function, in addition to an integrally-provided or stand-alone image output terminal of a data processing equipment such as a computer.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-323102 filed on Sep. 16, 2003, the entire contents of which are incorporated herein by reference.

What is claimed is:

1. A system in which a first electronic device with at least a battery as a primary power source and a second electronic device with an AC power source as a primary power source are interconnected via a communication path including a power supply line, the first electronic device operating as a master which controls a slave via the communication path in a master-slave relation and the second electronic device operating as the slave in the master-slave relation, wherein said first electronic device comprises:

detection means for detecting residual power of said battery;

request means for, in accordance with a result of detection by said detection means, issuing a request to said second electronic device, so as to receive power supply from said second electronic device;

switch means for switching over said first electronic device from the master to the slave in accordance with the result of detection by said detection means;

charging means for receiving the power supply from said second electronic device via said power supply line and charging said battery when said first electronic device is switched over from the master to the slave by said switch means; and returning means for returning the first electronic device to the master after completion of charging by said charging means, and wherein said second electronic device comprises power supply means for, in accordance with the request by said request means, supplying electric power from said AC power source to said first electronic device via said power supply line, the request corresponding with the second electronic device switching over from the slave to the master.

2. A power supply method for a system in which a first electronic device with at least a battery as a primary power source and a second electronic device with an AC power source as a primary power source are interconnected via a communication path including a power supply line, the first electronic device operating as a master which controls a slave via the communication path in a master-slave relation and the second electronic device operating as the slave in the master-slave relation, comprising:

a detection step of detecting residual power of said battery in said first electronic device;

a switch-over step of, in accordance with a detection of result at said detection step, switching over said first electronic device from the master to the slave and switching over said second electronic device from the slave to the master;

a supply step of supplying electric power from the AC power source of said second electronic device to said first electronic device via said power supply line when said second electronic device is switched over from the slave to the master at said switch-over step;

a charging step of receiving the power supply from said second electronic device via said power supply line and charging said battery; and a returning step of, after completion of charging at said charging step, returning said first electronic device to the master and returning said second electronic device to the slave.

3. The method according to claim 2, further comprising a determination step of determining whether or not the charging at said charging step is completed after switching over said first electronic device from the slave to the master and switching over said second electronic device from the master to the slave.

4. The method according to claim 3, further comprising: a time monitor step of monitoring elapsed time from start of power supply from said second electronic device to said first electronic device, wherein, if it is determined by time monitoring at said time monitor step that a predetermined period has elapsed, the master-slave relation is switched over at said determination step.

5. The method according to claim 2, further comprising: a communication step of performing data communication between said first and second electronic devices via said communication path, wherein after completion of communication at said communication step, the residual power of said battery is detected at said detection step.

6. An electronic device, primarily driven with a battery, connectable with an external device via a communication path including a power supply line, the electronic device normally operating as a master which controls said external device via the communication path, comprising: detection means for detecting residual power of said battery; request means for, in accordance with a result of detection by said detection means, issuing a request to said external device, so as to receive power supply from said external device; charging means for switching an operation status of said electronic device over from the master to a slave which is controlled by said external device via the communication path, receiving the power supply from said external device via said power supply line, and charging said battery; and returning means for switching the operation status over from the slave to the master after completion of charging operation by said charging means.

7. An electronic device, primarily driven with an AC power source, connectable to an external device via a communication path including a power supply line, the electronic device normally operating as a slave which is controlled by said external device via the communication path, comprising: first switch-over means for, when electric power is supplied to said external device in accordance with a request from said external device, switching an operation status of said electronic device over from the slave to a master which controls said external device via the communication path; power supply means for supplying the electric power from said AC power source to said external device via said power supply line when the operation status is switched over from the slave to the master; and second switch-over means for, when power supply to said external device is stopped, switching the operation status over from the master to the slave.

8. A power supply method for a system in which a first electronic device with at least a battery as a primary power source and a second electronic device with an AC power source as a primary power source are interconnected via a communication path including a power supply line, the first electronic device operating as a master which controls a slave via the communication path in a master-slave relation and the second electronic device operating as the slave in the master-slave relation, comprising: a detection step of detecting residual power of said battery in said first electronic device; a switch-over step of, in accordance with a detection of result at said detection step, switching over said first electronic device from the master to the slave and switching over said second electronic device from the slave to the master; a supply step of supplying electric power from the AC power source of said second electronic device to said first electronic device via said power supply line when said second electronic device is switched over from the slave to the master at said switch-over step; and a charging step of receiving the power supply from said second electronic device via said power supply line and charging said battery.

9. The method according to claim 8, further comprising a return step of, after completion of charging operation at said charging step, returning said first electronic device to the master and returning said second electronic device to the slave.

10. The method according to claim 8, further comprising a return step of, in a case where said first electronic device has data to be communicated with said second electronic device, returning said first electronic device to the master and returning said second electronic device to the slave.

11. The method according to claim 10, wherein even before completion of charging operation at said charging step, at said returning step said first electronic device is returned to the master and said second electronic device is returned to the slave.

12. The method according to claim 3, further comprising: a status check step of, when the power supply from said second electronic device to said first electronic device has been started, making an inquiry about a device status from said second electronic device to said first electronic device; a response step of, in response to said inquiry, returning a current device status from said first electronic device to said second electronic device; and a switch-over control step of, in accordance with the content of response at said response step, controlling so as to switch over the master-slave relation.

13. The method according to claim 2, wherein said first electronic device includes a cellular phone and a personal digital assistant (PDA), and said second electronic device includes a printing apparatus for receiving data from said cellular phone and said personal digital assistant, and performing printing.

14. The method according to claim 13, wherein said printing apparatus is an inkjet printing apparatus which performs printing by using an inkjet printhead to perform printing by discharging ink.

15. The method according to claim 14, wherein said inkjet printhead has electrothermal transducers to generate thermal energy to be supplied to the ink for discharging the ink by utilizing the thermal energy.

* * * * *